United States Patent [19]

Manofsky et al.

[11] Patent Number: 5,775,379

[45] Date of Patent: Jul. 7, 1998

[54] INSULATION JACKET FOR FLUID CARRYING CONDUITS

[75] Inventors: William L. Manofsky, San Jose; Simon Yavelberg, Cupertino, both of Calif.

[73] Assignee: Applied Materials, Inc., Santa Clara, Calif.

[21] Appl. No.: 536,714

[22] Filed: Sep. 29, 1995

[51] Int. Cl.$^6$ ................................................. F16L 9/14
[52] U.S. Cl. ........................... 138/149; 138/158; 138/169
[58] Field of Search ........................... 138/149, 158, 138/159, 160, 167, 169, 157

[56] References Cited

U.S. PATENT DOCUMENTS

| | | | |
|---|---|---|---|
| 2,308,343 | 1/1943 | Wilkinson et al. | 138/132 |
| 2,364,332 | 12/1944 | Wilkinson | 138/132 |
| 3,095,337 | 6/1963 | Chase | 154/45 |
| 3,126,035 | 3/1964 | Espetvedt | 138/45 |
| 3,223,125 | 12/1965 | Melander | 138/157 |
| 3,557,840 | 1/1971 | Maybee | 138/149 |
| 3,563,825 | 2/1971 | Segura et al. | 138/149 |
| 3,626,987 | 12/1971 | Bittner | 138/149 |
| 3,628,572 | 12/1971 | Shannon | 138/149 |
| 4,823,845 | 4/1989 | Martin et al. | 138/149 |
| 4,909,282 | 3/1990 | Staugaard | 138/149 |
| 5,069,969 | 12/1991 | McClintock et al. | 428/36.5 |
| 5,160,769 | 11/1992 | Garrett | 138/149 |
| 5,400,602 | 3/1995 | Chang et al. | 138/149 |

FOREIGN PATENT DOCUMENTS 2 200 713 A  8/1988  United Kingdom .

*Primary Examiner*—David Scherbel
*Assistant Examiner*—James F. Hook
*Attorney, Agent, or Firm*—Michael A. Glenn; Peter J. Sgarbossa; James C. Wilson

[57] ABSTRACT

A removable insulation jacket for a fluid carrying conduit includes an inner backing layer preformed to securely fit around the conduit. Insulation material is affixed to the inner backing layer and joined to an outer shell. The insulation jacket is placed around the conduit by engaging the insulation jacket with the conduit along an axial opening formed along the length of the insulation jacket, and the opening is then sealed at the outer shell to secure the insulation material about the conduit. The insulation jacket is pleated to conform to bends and curves that may occur along the length of the conduit.

15 Claims, 4 Drawing Sheets

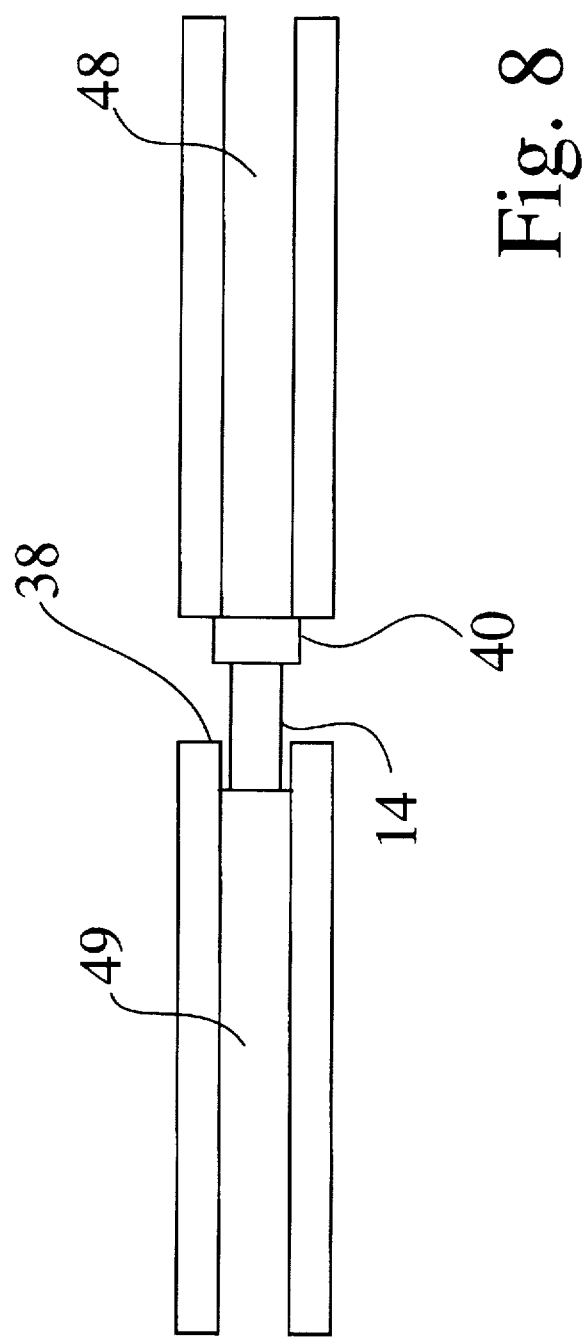

INSULATION JACKET FOR FLUID CARRYING CONDUITS

BACKGROUND OF THE INVENTION

1. Technical Field

The invention relates to conduits that are useful for transporting fluids. More particularly, the invention relates to the insulation of such conduits to assist in maintaining the contents thereof at a desired temperature.

2. Description of the Prior Art

During transport through a conduit, the contents of the conduit may be subjected to a wide range of temperatures, depending upon conduit location (e.g. controlled or ambient environmental conditions), length of the conduit, and fluid pressure within the conduit. These variations in temperature can affect the contents of the conduit, such that a vapor component of the conduit's contents may become condensed, e.g. water condensation may occur.

Such vapor condensation is highly undesirable in most fluid transport applications. For example, the liquid may freeze and disrupt fluid flow within the conduit or even rupture the conduit, causing untold waste and creating serious environmental and health hazards. The liquid or partially frozen liquid may also be transferred through the conduit and into processing equipment, adversely affecting equipment operation, contaminating process constituents, or even damaging the equipment and/or work in progress.

To avoid the problems associated with vapor condensation, it is a common practice in the semiconductor industry, for example, to heat the pipes that are used to transport certain gases to and from processing equipment. The use of heat prevents water vapor condensation or freezing, and other undesired effects associated therewith, e.g. when water vapor is allowed to condense inside a mass flow controller (MFC) the metering accuracy of the controller is adversely affected. In such event, normal operation of the controller may only be obtained after the MFC is dried out.

Such fluid heating is also helpful to maintain the fluids at a proper temperature, such that state conversion, e.g. from gas to liquid, does not occur. For example, the chemicals that are used in semiconductor processing, including water, may be less hazardous or corrosive in a gaseous form than in a liquid form, e.g. $BBr_3$ is corrosive when in liquid form, but not corrosive in gaseous form. Thus, it is beneficial to maintain such chemicals at an elevated temperature, at a corresponding unsaturated vapor pressure.

The state of the art for heating a conduit such that its contents are maintained at a constant and/or elevated temperature consists of a heating cable or ribbon, such as is manufactured by the Chemelex Division of Raychem Corporation, Menlo Park, Calif. The heating ribbon is typically formed with a conductive polymer in which a self-regulating polymeric heating element, made of a polymer mixed with conductive carbon is formed between parallel conductive bus wires. This structure is maintained along an entire ribbon length.

Such prior art heating ribbon is often wrapped in an electrically insulating sheath. As electrical insulation is usually thermally insulating there is typically some loss of efficiency in heat transfer from the heating ribbon to the conduit. A thermally insulating sheath may also be installed around the conduit, as well as the heating ribbon to prevent heat loss and thus improve heat transfer efficiency.

Such heating ribbons are moderately compliant and flexible and therefore may be wrapped around a conduit or run along the length of a conduit in a manner that somewhat conforms to the shape of the conduit. The heating ribbons are attached to a conduit by special fasteners (e.g. tie wraps or wire), one placed every few inches, followed by a combination of insulation and metal tape, or they may be wrapped with tape along the length of the conduit. The heating ribbons are readily powered by any convenient source, usually an AC mains power source.

Such heated conduits are preferably insulated to maintain a constant temperature along the line, as well as for the safety of workers in the manufacturing facility. Currently, heated chamber lines are insulated with foam insulation that is wrapped around the gas lines.

A typical fluid conduit is not straight, but has curves and bends in different directions. FIG. 1 is a side view of an insulated heated gas delivery line according to the prior art. A tape line heater 13 is run along the pipe 15, following all of the bends 17, turns, and tees of the pipe. A layer of insulation material 12 is placed around the pipe by an assembler. This foam insulation is then manually wrapped with tape 16 along the length of the pipe. The entire insulating process is very time consuming and labor intensive.

In the event of a heater or pipe failure, the taped conduit must be unwrapped and the insulation removed by hand. In addition, the entire line must be removed, because the tape usually cannot be unwrapped for individual sections. It would be a significant advance in the art to provide a means for quickly and easily insulating a heated fluid delivery conduit. It would be a further advance in the art if the insulation were readily removed for individual sections of the conduit.

SUMMARY OF THE INVENTION

The invention provides a removable insulation jacket for fluid carrying conduits, such as heated gas delivery lines. Insulation material is affixed or abutted to a semi-rigid, resilient shell to form an insulation jacket. The insulation jacket is placed around, and securely encloses, the conduit. The jacket is then disengageably sealed, securing the insulation about the conduit. The insulation jacket is pleated to conform to any bends and curves that may occur along the length of the conduit. Sections of the insulation jacket are releasably joined to one another by such fasteners as snaps, tape, rings, and junctions.

BRIEF DESCRIPTION OF THE DRAWINGS

FIG. 8 is a schematic view of male and female members for joining two insulation jackets according to another, equally preferred embodiment of the invention.

DETAILED DESCRIPTION OF THE INVENTION

The invention provides a removable jacket for thermally insulating fluid carrying conduits, such as heated gas lines. It is also expected that the invention is readily applicable to any other fluid carrying conduit, such as pipelines that are not heated, but that are preferably insulated, and pipelines that are cooled, and that should be insulated to maintain a lower than ambient temperature within the pipeline.

Figure 1:
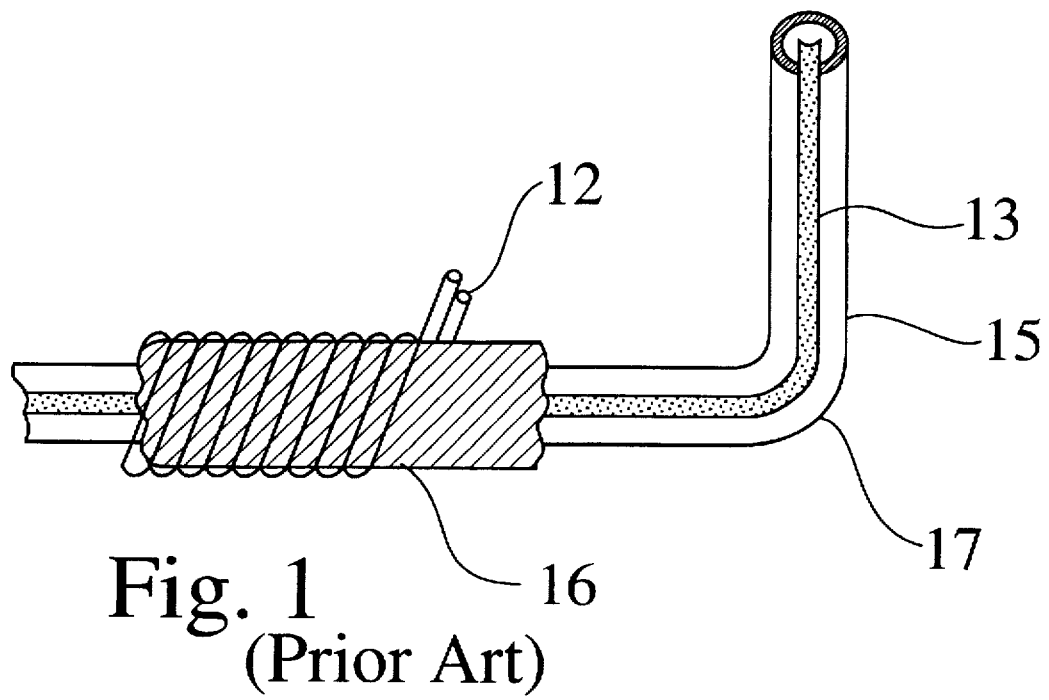
FIG. 1 is a schematic view of an insulated heated fluid carrying conduit.
Figure 2:
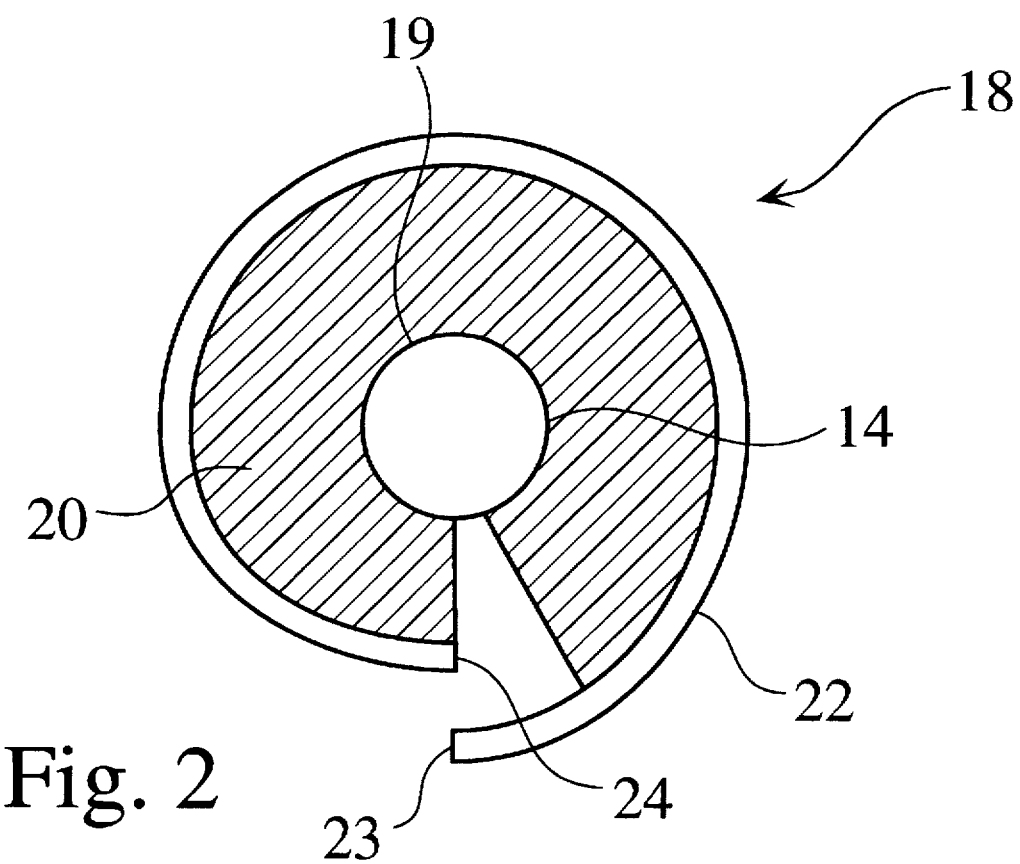
FIG. 2 is a cross-sectional view of an insulation jacket for a heated fluid carrying conduit according to the invention.

FIG. 2 is a cross-sectional view of an insulation jacket 18 that is useful for insulating a fluid carrying conduit, such as a heated gas delivery line. A heater line 21 may also be affixed to the conduit (see FIG. 3) within the confines of the insulating jacket if the conduit is to be heated. The insulation jacket 18 has an inner diameter that is sufficient to accommodate and completely surround a fluid carrying conduit 14. An inner surface of the insulation jacket includes an insulation layer 20 which substantially conforms to the shape of the conduit, and which is composed of an insulating material, preferably a fiber based material, or a closed cell foam or polymeric material. The insulating material is typically ¼-inch to three inches in thickness. However, the thickness of the material is readily varied to provide the required level of insulation for a particular application.

In the preferred embodiment of the invention, an optional molded inner backing layer 19 may also be included in conjunction with the insulation layer to provide a rigid, yet resilient surface to which the insulating layer may be affixed and which, in connection with an outer shell (discussed below), forms a sandwich-like structure.

The outer shell 22 may be joined to the insulation material to form an insulation jacket. The outer shell is made of a semi-rigid, yet resilient material that removably secures the insulation material about the conduit. The outer shell may be formed of such materials as rubberized cloth or polymeric materials, such as polystyrene and polyvinyl chloride. The insulation jacket forms a sandwich-like assembly, preferably where the thickness and type of insulation maintain the outer surface of the outer shell at a temperature that is not sufficiently hot that it can burn a worker who may come into contact with the insulation jacket.

The insulation jacket includes an axial opening the extends along the length of the insulation jacket, and from the outer surface of the outer shell to the inner surface of the backing layer. The insulation jacket is thus readily engaged with, and placed around, the conduit along the length of the conduit. The insulating jacket includes two edges 23, 24 that extend axially and thereby define the opening. The edges are arranged to either tightly abut one another or such that one edge slightly overlaps the other edge, such that the insulation jacket is disengageably sealed along the length of the opening to maintain thermal continuity about the circumference of, and along the length of, the insulation jacket.

The edges may be secured together to seal the insulation jacket by such means as friction, snaps, interlocking complementary male and female edges, clamps, tie ropes, Velcro-type arrangements, screws, and couplers. Such closure means may also include rings and sleeves adapted to cover a portion of the insulation jacket, thereby holding the opposing ends of consecutive insulating jacket sections together. In a preferred embodiment of the invention, the outer shell of the insulation jacket may be formed of a rigid and resilient polymer material that is molded to exert pressure upon the insulation layer when the insulation jacket is placed around the conduit, such that the insulation jacket may be sealed without the need of a fastener.

The insulation jacket is preferably installed by cutting it to the length of the conduit, or by joining it to other insulation jackets, as required. The insulation jacket thus is an integrated insulator and sealing band, eliminating the need for manually wrapping the insulation layer with tape, and thereby obviating the need for wrapping and unwrapping the conduit as a part of a maintenance or repair regimen. Because the insulation jacket is pleated (as discussed below) to flex when the insulation jacket is fitted over bends, curves, and tees that may be encountered along the length of the conduit, it is quickly and easily fitted over the conduit with minimal labor and material cost.

Figure 3:
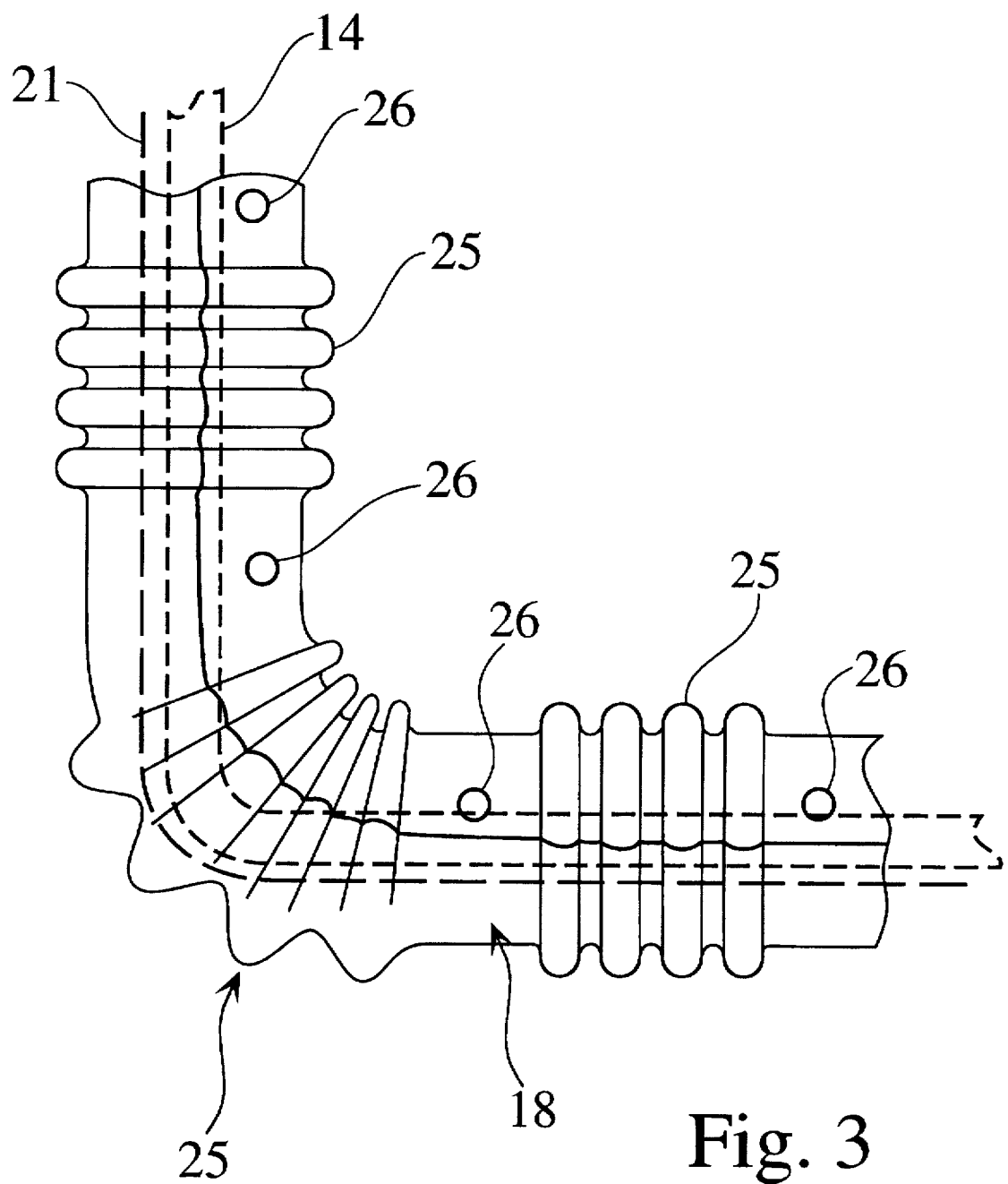
FIG. 3 is a schematic view of the insulation jacket according to the invention.

FIG. 3 is a schematic view of the insulation jacket according to the invention. As discussed above, the insulation jacket includes flexible pleats 25 that allow the insulation jacket to conform to bends and curves along the length of the conduit. Alternate embodiments of the invention may include separate pleated insulation jackets solely for insulating bends along the path of the conduit, while non-pleated insulation jackets may be provided to insulate straight lengths of the conduit.

Figure 4:
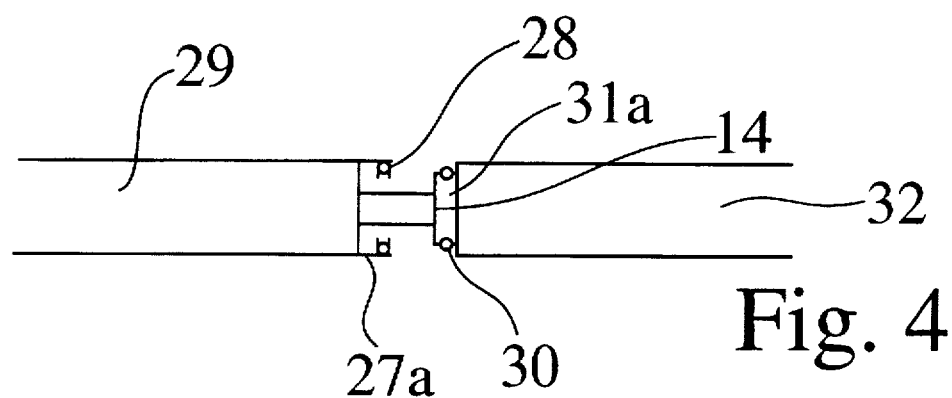
FIG. 4 is a schematic view of a snap closure for joining two insulation jackets according to a preferred embodiment of the invention.

In the embodiment of the invention illustrated in FIG. 3, the edges of the insulation jacket are secured with snaps 26 to seal the insulating jacket against thermal loss along the length of the opening, as well as to hold the insulating jacket in place about the conduit. A schematic view of a snap closure that releasably joins two sections of non-pleated insulation jackets 29, 32 is shown in FIG. 4. At least one female snap 28 is provided at an end 27a of a first insulation jacket 29. At least one complementary female snap 30 is positioned at an adjoining end 31a of a second insulation jacket 32. The male and female snaps are interengaged to join the insulation jackets together. Individual insulation jackets are readily detached from one another and unfastened to permit access to the underlying conduit and heater (if the conduit is heated). The snaps are preferably formed of a non-metallic material such as plastic or nylon, because metal is a thermal conductor and can thereby provide a heat sink that reduces the effectiveness of the insulating jacket, as well as provide a hot spot that might burn a worker when touched.

Figure 5:
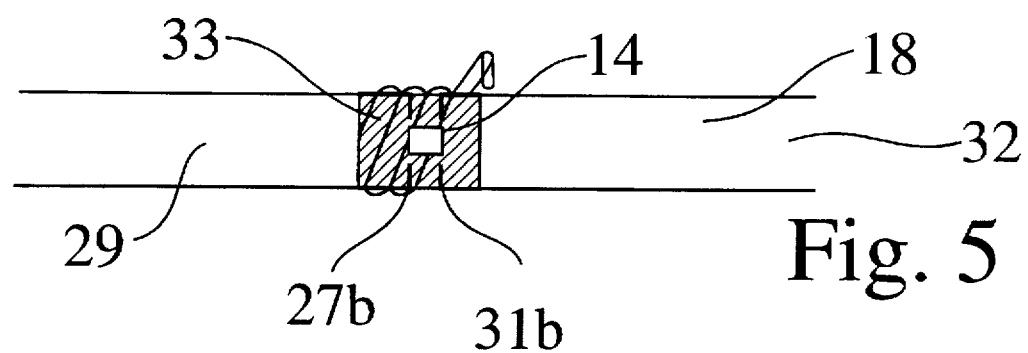
FIG. 5 is a schematic view of a taped closure for joining two insulation jackets according to another, equally preferred embodiment of the invention.

FIG. 5 is a schematic view of a taped closure according to an alternate, equally preferred embodiment of the invention. The ends 27b, 31b of the first and second insulation jackets 29, 32 are brought together and wrapped with tape 33. This embodiment of the invention offers the advantage of providing a seal that is very efficient at holding the heat within the insulation jacket, yet in which the tape only need be removed at the point at which the two sections of insulating jacket are joined to effect maintenance or repair of the underlying conduit/heater.

Figure 6:
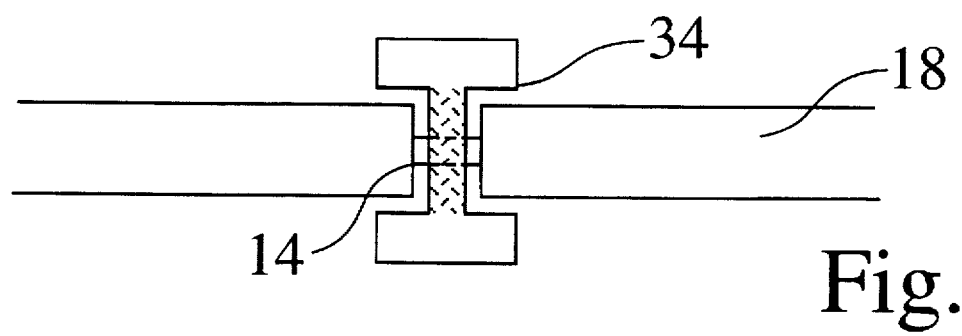
FIG. 6 is a schematic view of a junction closure for joining two insulation jackets according to another, equally preferred embodiment of the invention.
Figure 7:
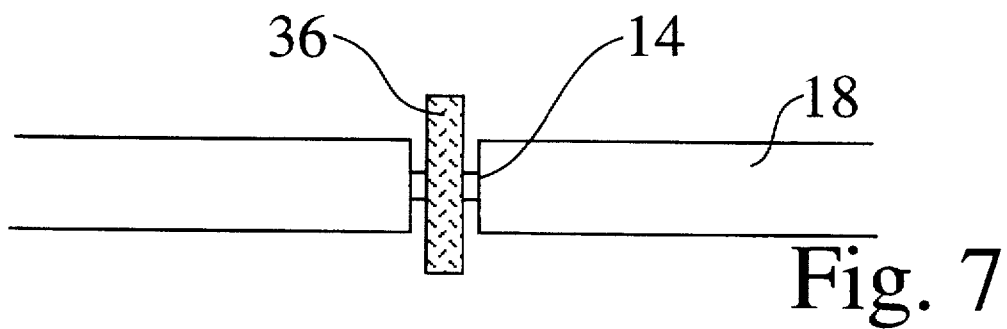
FIG. 7 is a schematic view of a ring closure for joining two insulation jackets according to another, equally preferred embodiment of the invention.

In alternate embodiments of the invention, the insulation jackets are releasably joined together by means such as a junction closure 34 that provides a pair of opposing, coaxial recesses into which the respective ends of the two insulating jackets may be securely pressed to form a thermally insulative joint, as shown in FIG. 6; and a ring closure 36 that has an inner diameter sufficient to accommodate the outer diameter of the insulating jackets, and that is long enough that at least a portion of an end of each adjoining insulating jacket may be pressed into the ring to form a secure, thermally insulative joint, as shown in FIG. 7, and adapted to receive and hold together the insulation jacket ends. Other closure means may include, for example sleeves that cover the insulation jacket ends, clamps, tie ropes, Velcro-type arrangements, screws, and couplers. In yet another embodiment of the invention, shown in FIG. 8, the end of a first insulation jacket 49 includes a female member 38 that receives and securely holds a male end 40 of a second insulation jacket 48.

Although the invention is described herein with reference to the preferred embodiment, one skilled in the art will readily appreciate that other applications may be substituted for those set forth herein without departing from the spirit and scope of the invention. For example, the insulation jacket herein described may be used with other types of conduits, such as refrigerated pipe lines, and electrical conduits. The invention is equally applicable to conduits that include an auxiliary heater line, as well as conduits that transport heated fluids. The insulation jacket may also be used with heater units, boilers, generators, and refrigeration units. Furthermore, the invention is readily used in a semiconductor fabrication clean room, as well as for other industrial uses. Accordingly, the invention should only be limited by the claims included below.

We claim:

1. An insulation jacket for a fluid carrying conduit, comprising:

insulation material adapted to surround and thermally insulate said conduit, said insulation material having an inner diameter;

a semi-rigid, resilient outer shell having an axial opening that extends along a length thereof, said outer shell adapted to engage with said conduit along said opening and to entirely surround said conduit and said insulation material, wherein said insulation material substantially conforms to said conduit and is secured about said conduit by said outer shell;

means for fixedly closing said opening to seal said outer shell about said conduit and said insulation; and wherein entire said insulation jacket has a plurality of pleats that provide points of flexure which allow said insulation jacket to conform to bends and curves that occur along a length of said conduit.

2. The insulation jacket of claim 1, further comprising:

a semi-rigid, resilient inner backing layer positioned at a surface of said insulating material that faces toward said conduit.

3. The insulation jacket of claim 2, wherein said inner backing layer is formed of a fiber-based material.

4. The insulation jacket of claim 1, wherein said insulation material comprises closed cell foam.

5. The insulation jacket of claim 1, wherein said outer shell is formed of a material selected from the group consisting of rubberized cloth and polymeric material.

6. The insulation jacket of claim 1, wherein said means for closing further comprising any of snaps, interlocking complementary male and female edges, clamps, tie ropes, Velcro-type arrangements, screws, rings, sleeves, tape, and couplers.

7. The insulation jacket of claim 1, further comprising:

means for joining an end of a first insulation jacket to an opposing end of a second insulation jacket to form a continuous, uninterrupted insulation sheath along a length of said conduit.

8. The insulation jacket of claim 7, wherein said means for joining comprises any of tape, junctions, rings, sleeves, clamps, tie ropes, Velcro-type arrangements, screws, and couplers.

9. The insulation jacket of claim 7, wherein said first insulation jacket has as at least one end a male member, and wherein said second insulation jacket has as at least one end a complementary female recess that securely receives said male member.

10. An insulation jacket for a conduit, comprising:

a preformed inner backing layer shaped to conform to and to surround said conduit;

insulation material affixed to said inner layer for thermally insulating said conduit, said insulation material having an inner diameter;

an outer shell joined to said insulation material, said outer shell, insulation material, and inner backing defining a sandwich-like structure having an axial opening that extends along a length thereof and that is adapted to engage with said conduit, whereby said insulation jacket surrounds said conduit;

means for sealing said opening at said outer shell; and wherein substantially the entire said insulation jacket is pleated to conform to bends and curves in said conduit.

11. The insulation jacket of claim 10, further comprising:

means for releasably joining a first insulation jacket to a second insulation jacket;

wherein said joining means is selected from the group consisting of tape, junctions, rings, sleeves, clamps, tie ropes, Velcro-type arrangements, screws, couplers, and complementary interengageable male and female members.

12. The insulation jacket of claim 10, wherein said preformed inner backing layer is formed of an insulating material.

13. The insulation jacket of claim 12, wherein said preformed inner backing layer insulating material is a fiber-based material.

14. The insulation jacket of claim 10, wherein said insulation material comprises a closed cell foam.

15. The insulation jacket of claim 10, wherein said outer shell is formed of a material selected from the group consisting of rubberized cloth and polymeric material.

* * * * *